(12) United States Patent
Huang

(10) Patent No.: US 7,247,387 B1
(45) Date of Patent: *Jul. 24, 2007

(54) MATERIAL AND PROCESS FOR CONTROLLED THIN POLYMERIC COATINGS ON PLASTIC SURFACE

(75) Inventor: Xueying Huang, Huckessin, DE (US)

(73) Assignee: Sepax Technologies Inc., Newark, DE (US)

( * ) Notice: Subject to any disclaimer, the term of this patent is extended or adjusted under 35 U.S.C. 154(b) by 209 days.

This patent is subject to a terminal disclaimer.

(21) Appl. No.: 10/887,672

(22) Filed: Jul. 10, 2004

Related U.S. Application Data

(60) Provisional application No. 60/489,856, filed on Jul. 24, 2003.

(51) Int. Cl.
*B32B 9/04* (2006.01)
*C08F 2/00* (2006.01)

(52) U.S. Cl. ............... 428/447; 526/81; 526/87; 526/91; 526/109; 526/118; 526/201

(58) Field of Classification Search ............ 428/447, 428/446; 526/81, 87, 91, 109, 118, 201
See application file for complete search history.

(56) References Cited

U.S. PATENT DOCUMENTS

| | | | |
|---|---|---|---|
| 5,344,701 A | 9/1994 | Gagnon | |
| 5,352,714 A | 10/1994 | Lai | |
| 5,364,918 A * | 11/1994 | Valint et al. | 526/245 |
| 5,525,691 A | 6/1996 | Valint | |
| 5,621,018 A | 4/1997 | Chabrecek | |
| 5,652,014 A | 7/1997 | Galin | |
| 5,789,487 A * | 8/1998 | Matyjaszewski et al. | 525/301 |
| 5,807,937 A * | 9/1998 | Matyjaszewski et al. | 526/135 |
| 6,200,626 B1 | 3/2001 | Grobe | |
| 6,440,571 B1 | 8/2002 | Valint | |
| 6,653,415 B1 * | 11/2003 | Bottcher et al. | 526/135 |

FOREIGN PATENT DOCUMENTS

JP 2004018556 A * 1/2004

OTHER PUBLICATIONS

Xianyi Chen, Steven Armes, Surface Polymerization of Hydrophilic Methacrylates from Ultrafine Silica SOIs in Protic Media at Ambient Temperature: A Novel Approach to Surface Functionalization Using a Polylcetrolyic Macroinitiator, 2003, Adv. Mater, 15(18), 1558-1562.*
English Translation of JP 2004-018556A.*
M. Husseman et al, Macromolecules, 1999, 32, 1424.*
Huang "Surface-Confined Living Radical Polymerization for Coating in Capillary Eletrophorsis." Anal. Chem. 1998, 4023-4029, 70. American Chemical Society.
Deging Xiao and Mary J. Wirth "Kinetics of Surface-Initiated Atom Transfer Radical Polymerization of Acrylamide on Silica" Macromolecules 2002, 35, 2919-2925.
Mircea Teodorescu and Krzysztof Matyjaszewski Atom Transfer Radical Polymerization of (Meth)acrylamides Macromolecules 1999, 32, 4826-4831.
X. Huang and M.J. Wirth "Surface Initiation of Living Radical Polymerization for Growth of Tethered Chains of Low Polydispersity" Macromolecules 1999, 32, 1694-1696.

* cited by examiner

*Primary Examiner*—Randy Gulakowski
*Assistant Examiner*—Alicia M. Toscano

(57) ABSTRACT

This invention provides a chemically coated surface for the plastics surface such as contact lens. The chemical surface coating comprises of at least one addition polymer prepared from addition monomers selected from a group consisting of acrylates and its derivatives, metharylates and its derivatives, styrene and its derivatives, acrylamide, methacrylamide, dimethacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid and methacrylic acid. This invention also provides a chemical process for making the chemically coated surface on the plastics surface. The process comprises:

(a) contacting the plastics surface with a coupling agent solution, then
(b) contacting the plastics surface with a first living radical polymerizing solution, and optionally
(c) contacting the plastics surface with a second living radical polymerizing solution.

25 Claims, No Drawings

MATERIAL AND PROCESS FOR CONTROLLED THIN POLYMERIC COATINGS ON PLASTIC SURFACE

CROSS REFERENCE TO RELATED APPLICATION

This application is related to and incorporates by reference the U.S. Provisional Application No. 60/489,856, which was filed on Jul. 24, 2003. This application claims the priority filing date of the U.S. Provisional Application No. 60/489,856, which was filed on Jul. 24, 2003.

FIELD OF THE INVENTION

The present invention relates to an ordered polymer thin film on the surface of plastics such as contact lenses. In particular, the polymer coating possesses ordered polymer structure and controlled polymer length, polymer chain density and functionality for increasing contact lens' biocompatibility and its resistance to the binding of biological molecules. This invention also relates to a process of forming such controlled thin coatings by surface living radical polymerization of addition monomers on the plastic substrate surface.

BACKGROUND OF THE INVENTION

Contact lenses made from various polymeric materials have been investigated for a number of years. Such materials can generally be subdivided into two major classes: hydrogels and non-hydrogels. Non-hydrogels do not absorb appreciable amounts of water, whereas hydrogels can absorb and retain water in an equilibrium state. Hydrogels generally have water content greater than about five weight percent and more commonly between about 10 to about 80 weight percent. Regardless of their water content, both non-hydrogel and hydrogel contact lenses tend to have relatively hydrophobic, non-wettable surfaces. Contact lenses also readily absorb substances from the fluids that surround them. In an industrial setting this can have potentially serious complications as the contact lenses can absorb noxious chemicals and hold them in contact with the cornea for a substantial period of time. Unwanted absorption of substances may also result in discoloring of lenses or an uptake of preservatives, resulting in subsequent long-term hypersensitivity problems. The hydrophobic surface of the lens especially attracts binding of proteins via hydrophobic interactions. The protein layers adsorbed on the contact lens surface can blur vision and further get bacteria attach to them, causing infections, which can lead to permanent visual loss.

Surface structure and composition determine many of the physical properties and ultimate uses of solid materials. Characteristics such as wetting, adhesion and lubricity are largely influenced by surface characteristics. The alteration of surface characteristics is of special significance in biomedical applications, where biocompatibility and adhesion properties are of particular concern. Therefore, people have recognized the need for rendering the surface of contact lenses and other medical devices hydrophilic and resisting to biological binding. Increasing the hydrophilicity of the contact lens surface improves its wettability with tear fluid in the eye. This in turn improves the wear comfort of the contact lenses. A hydrophilic, neutral charge coating can also suppress protein and lipid binding to reduce eye infection. In the case of continuous wearing lenses, the surface is especially important. The surface of a continuous-wear lens must be designed not only for comfort, but also for avoiding adverse reactions such as corneal edema, inflammation, or lymphocyte infiltration.

Various patents have disclosed the attachment of hydrophilic polymer coatings to the contact lens surface in order to render the lens more biocompatible. For example, U.S. Pat. No. 5,652,014 (Galin et al., "Medicament coated refractive anterior chamber ocular implant") disclosed amination of a contact lens substrate followed by reaction with polymers, such as a PEO star molecule or a sulfated polysaccharide. U.S. Pat. No. 5,344,701 (Gagnon et al., "Porous supports having azlactone-functional surfaces") taught the attachment of oxazolinone or azlactone monomers to a substrate by means of plasma. The oxazolinone group is attached to a porous substrate by reaction of the ethylenic unsaturation in the oxazolinone monomer with radicals formed by plasma on the substrate surface. U.S. Pat. No. 6,200,626 (Grobe et al., "Surface-treatment of silicone medical devices comprising an intermediate carbon coating and graft polymerization") disclosed coating silicone hydrogel contact lenses with a carbon-containing layer made from a diolefinic compound having 4 to 8 carbon atoms by the surface plasma treatment, and then graft polymerization of a mixture of monomers comprising hydrophilic monomers onto the carbon layer. U.S. Pat. No. 5,364,918 (Valint, Jr. et al., "Surface modification of polymer objects") and U.S. Pat. No. 5,525,691 (Valint, Jr. et al., "Surface modification of polymeric objects") disclosed a method of modifying the contact lens surface by adding a polymerizable surfactant to the monomer mixture. U.S. Pat. No. 5,352,714 (Lai et al., "Wettable silicone hydrogel compositions and methods for their manufacture") disclose a method of improving silicone-containing hydrogels for enhanced wettability. U.S. Pat. No. 5,621,018 (Chabrecek et al, "Functionalized photoinitiators, macromers thereof, and the use thereof") introduced functionalized photoinitiators onto contact lenses to modify surface by polymerization of photopolymerizable monomers. U.S. Pat. No. 6,440,571 (Valint, Jr. et al., "Surface treatment of silicone medical devices with reactive hydrophilic polymers") disclosed surface treatment of silicon medical devices with reactive hydrophilic polymers. All the above methods for preparing coatings relates to free radical polymerization. However, free radical polymerization has limitations in the following aspects: (1) The polymerization happens both in solution and on the surface of the contact lens. The solution polymers could be physically attached to the surface of the contact lens, which eventually leaks into the eye, causing problems to the eye. (2) For free radical polymerization process, the majority of the polymer is formed in the solution. Both monomers and free polymers formed in the solution could be grafted to the surface of the contact lens, resulting in non-uniform polymer surface and no control on the thickness of the coating. (3) For free radical polymerization process, there is no order for the polymer thin film. In addition, there is no control of the polymer chain density.

It is desirable to have a method that is a much better control process for coating the surface of the contact lens than that of the free radical polymerization. It is also desirable to have this controlled process to generate an optically clear thin coating for the surface of a medical device that renders the device hydrophilic, biocompatible and suppressing binding of proteins and lipids onto the surface. Moreover, it is desirable to form a coating for contact lens that is capable of continuous wear for long time, preferably for a week or more and simultaneously tear-wettable and highly permeable to oxygen without adverse effects to the cornea.

SUMMARY OF INVENTION

The present invention provides a uniform and hydrophilic coating on the contact lens surface to render bio-compatibility and suppress bindings of proteins, bacteria or other biological entities. The coating comprises of at least one addition polymers prepared from addition monomers selected from a group consisting of acrylates and its derivatives, methacrylates and its derivatives, styrene and its derivatives, acrylamide, methacrylamide, N-monosubstituted acrylamide, N-monosubstituted methacrylamide, N,N-bis-substituted acrylamide, N,N-bissubstituted methacrylamide, vinyl acetate, vinyl pyrolidone, vinyl ether, acrylic acid, methacrylic acid, etc. Preferred addition monomers are polyethylene glycol methacrylate with $(CH_2CH_2O)_n$, n=1-20, polyethylene glycol acrylate with $(CH_2CH_2O)_n$, n=1-20, glycidyl methacrylate, glycidyl acrylate, acrylamide, methacrylamide, dimethylacrylamide, vinyl pyrolidone. Most preferred addition monomers are polyethylene glycol methacrylate with $(CH_2CH_2O)_n$, n=1-20, polyethylene glycol acrylate with $(CH_2CH_2O)_n$, n=1-20, acrylamide, methacrylamide.

The present invention also provides a chemical process for making the chemically coated surface for the contact lens. The process comprises:
  (a) contacting the plastics surface with a coupling agent solution, then
  (b) contacting the plastics surface with a first living radical polymerizing solution, and optionally
  (c) contacting the plastics surface with a second living radical polymerizing solution.

DETAIL DESCRIPTION OF INVENTION

This invention is intent to provide chemical surface coatings on the plastics surface, such as the surface of contact lenses, to increase their bio-compatibility and to resist binding of proteins and bacteria secreted from the tears. The chemically coated surface comprises of a plastics surface, a coupling agent and a chemical surface coating comprising at least one addition polymer. The coupling agents attach onto the plastics surface and provide initiators for forming the chemical surface coating utilizing living radical polymerization reactions that are described in the reference (Matyjaszewski, etc. Chem. Rev. 2001, 101, 2921).

Plastics such as contact lenses are made from polymeric materials. Some plastics surfaces have adequate functional groups, such as OH, COOH, CHO, Br, Cl, $NH_2$, $NHR_1$, etc. wherein $R_1$ is hydrocarbyl or substituted hydrocarbyl, on the surface and can react directly with the coupling agents as described below in this invention. Others need proper treatment to generate adequate functional groups. One example is plasma treatment as described by Chabrecek et al. at WO 02/094331 A1 and by Barton et al. at J. Phys. Chem. B 1999, 103, 4423 and by Youngblood et al. at Macromolecules 1999, 32, 6800. Plasma treatment, preferred in the presence of oxygen, alcohol or other chemicals, and electron beam or other irradiation, is the most common or widely used method for generating hydroxyl, —COOH, amino or other functional groups on the surface of contact lenses. Most of the contact lenses are polymeric materials which contain —$CH_2$—$CH_2$— backbone. An inductively coupled, cold glow discharge plasma generated by a radio frequency generator impinged onto the plastics, oxidizing the surface to form functional groups, such as —OH, —COOH, and —CHO etc. The reactor containing the plastics substrate is vacuumed to about 0.001 to 0.5 mbar, more preferred is 0.005 to 0.1 mbar. The radio frequency (RF) is about 1 to 100 MHz. The plasma discharge power is about 10 to 1,000 Watts with preferred power at about 100 to 500 Watts.

The other example involves $UV/O_3$ oxidation of the surface as disclosed by Genzer et al. at Science 2000, 290, 2130. For silicon contained polymers, such as hydrogels and polydimethylsiloxane (PDMS), $UV/O_3$ treatment usually generates hydrophilic surface, mainly composed of hydroxyl groups. The above examples are used to elaborate methods used to generate functional groups on the plastics surface. However, it should be understood that the scope of this invention is not limited to these examples.

In this invention, a coupling agent plays a role of a platform on which a living radical polymerization can be conducted. Two types of coupling agents are disclosed here. One is a small bifunctional organic molecule where one functional group is used for covalent attaching to the plastics surface, and the other one is used as an initiator species that can generate a "living" radical for initiating polymerization of addition monomers. "Living" radical means a chain radical that has negligible chain transfer or termination reactions in the process of polymerization. A generic structure of a coupling agent is as following:

Z—L—Y

Z is a functional group capable of forming a covalent bond with a functional group on the plastics surface. For example, if the surface function group is COOH, Z is OH or halogen. Z can include, but are not limited to OH, COOH, CHO, Br, Cl, $NH_2$, $NHR_1$ wherein $R_1$ is hydrocarbyl or substituted hydrocarbyl.

L is a divalent organic moiety.

Y is a functional group capable of generating a living radical for initiating polymerization of addition monomers.

A preferred coupling agent is as following:

(1)

Q is a functional group capable of forming a covalent bond with a functional group on the plastics surface, n=3, 2, or 1, B is hydrocarbyl or substituted hydrocarbyl, L is a divalent organic moiety, Y is a functional group capable of generating a "living" radical for initiating polymerization of addition monomers.

Plastics surface can have various functional groups on the surface, such as OH, COOH, CHO, Br, Cl, $NH_2$, $NHR_1$ ($R_1$ is hydrocarbyl or substituted hydrocarbyl). Q is a functional group which can react with the corresponding surface functional group to form covalent bond. For the plastics surface with hydroxyl groups, preferred Q is selected from a group consisting of alkoxy, halogen or other hydrolyzable groups. Most preferred Q is selected from a group consisting of alkoxy, OH, Cl and Br.

The surface is reacted with the coupling agent by contacting a solution of the coupling agent in organic solvents such as toluene, THF, ether and dioxane. Coupling reaction can be done with or without catalysts. Where Q is alkoxy, acid or base can be used as a catalyst. Where Q is a halogen, it is unnecessary to use a base catalyst but the bases such as triethylamine and pyridine etc. can help the coupling reaction. The coupling reaction or self-assembling may need heat to expedite the reaction. The temperature range is from room temperature to up to 150° C.

In this invention, the functional group Y acts as a "living" radical initiator. The Y group can be halo-esters, halo-amides, halo-sulfones, halo-ketones, halo-benzyls and halo-allyl (halo=Cl, Br, I) with a general formula as shown below:

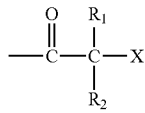

Wherein $R_1$, $R_2$ are independently selected from a group consisting of H, hydrocarbyl and substituted hydrocarbyl. X is selected from Cl, Br and I. Preferred is $R_1=R_2=CH_3$, X is Cl or Br.

Alternatively, Y can be a benzyl halogen with a general formula as shown below:

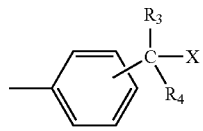

Wherein $R_3$, $R_4$ are independently selected from a group consisting of H, hydrocarbyl and substituted hydrocarbyl. X is selected from Cl, Br and I. Preferred is $R_3=R_4=CH_3$, X is Cl or Br.

The Y group can also be cyclic nitroxides such as 2,2,6,6-tetramethylpiperidinyl-1-oxy (TEMPO) or substituted TEMPO, dithiocarbamates such as RC(=S)S—. The "living" radical can be generated by metal complex catalysts or heating or light irradiation.

The other type of coupling agent can be a polymer or an oligomer that has two functional segments: one providing a binding with the plastics surface and the other providing an initiation species for "living" radical polymerization. Preferred polymer or oligomer backbone is a hydrocarbon chain. The binding domain with the plastics surface can be backbone or side chain. The binding can be achieved by hydrophobic interaction, hydrophilic interaction, electrostatic interaction or chemical bonds. For example, a plastics substrate treated by radio frequency plasma contains —COOH functional groups on the surface. COOH function group makes the surface negatively charged when pH is higher than 3, a random copolymer shown below (2) can be attached to the plastics surface via electrostatic interaction. Multiple binding sites of a polymeric coupling agent make the coating stable on the surface.

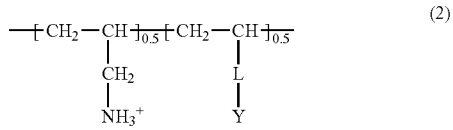

Some plastics surface are suitable for hydrophobic binding, one embodiment is a plastics which has hydrophobic surface as described in U.S. Pat. No. 5,621,018 (Chabrecek et al, "Functonalized photoinitiators, macromers thereof, and the use thereof"). A random copolymer coupling agent suitable for hydrophobic interaction is shown below:

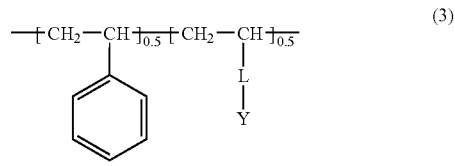

The binding functional groups on the polymeric or oligomeric coupling agent can also be functional groups that can form covalent bonds with the plastics surface. Such functional groups can be OH, COOH, CHO, Br, Cl, $NH_2$, $NHR_1$ ($R_1$ is hydrocarbyl or substituted hydrocarbyl). A random copolymer coupling agent of this kind is shown below:

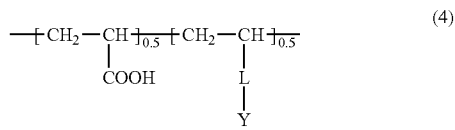

In structures 2, 3 and 4, L and Y are the same functional groups as in structure 1, i.e. L is a divalent organic moiety, Y is a functional group capable of generating a "living" radical for initiating polymerization of addition monomers.

After covalently bonding or physically binding the coupling agent on the plastics surface, in this invention, a chemical surface coating is achieved by a "living" radical polymerization. The process involves contacting a living radical polymerizing solution with the coupling agent attached plastics surface. In this invention, a living radical polymerizing solution comprises of at least one solvent, at least one catalyst and at least one addition monomer.

The polymerization can be conducted in aqueous or organic solutions. If the addition monomer is soluble in water, aqueous solution is the most preferred because water is a safe solvent and can reduce the cost. If the addition monomer is insoluble in water, in some case, aqueous solution can still be used under the help of suitable surfactant. Another preferred solvent system is a mixture of water and a water miscible organic solvent. The polymerization can also be conducted in most organic solvents and their mixtures which do not dissolve or swell the plastics surface, e.g. methanol, ethanol, acetone, isopropanol, DMF, DMAC, THF, dioxane, DMSO, toluene, benzene, chlorobenzene, trifluorotoluene, acetonitrile, etc.

Catalysts used in this invention are metal complex $MX_nE_m$ (M=Cu, Ni, Ru, Rh, Re or Pd; E is a ligand, such as, bipyridine and its derivatives, $Ph_3P$ and polyamine; X is Cl, Br or I; n=1 to 6, m=1 to 6). Polyamine herein means a molecule with at least two amine groups. Preferred catalysts are $CuX_nE_m$ wherein X is Cl or Br, E is selected from bipyridine and its derivatives, n=1 or 2, m=2. The most preferred catalysts are CuCl(bipyridine)$_2$ and CuCl$_2$(bipyridine)$_2$. In order to grow a controlled polymer on the support surface, it is crucial to add both CuX(bipyridine)$_2$ and CuX$_2$(bipyridine)$_2$ catalysts into the living radical polymerizing solution with certain molar ratio (e.g. [CuX(bipyridine)$_2$]/[CuX$_2$(bipyridine)$_2$]=5). The presence of both CuX(bipyridine)$_2$ and CuX$_2$(bipyridine)$_2$ enables generation of confined radicals on the surface that make the polymerization happens only on the surface in a workable speed.

Addition monomers used in this invention are selected from a group consisting of acrylates and its derivatives, metharylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid. Preferred addition monomers are selected from a group consisting of polyethylene glycol methacrylate with $(CH_2CH_2O)_n$, n=1-20, polyethylene glycol acrylate with $(CH_2CH_2O)_n$, n=1-20, glycidyl methacrylate, glycidyl acrylate, acrylamide, methacrylamide and vinyl pyrolidone. Most preferred monomers are selected from a group consisting of polyethylene glycol methacrylate with $(CH_2CH_2O)_n$, n=1-20, polyethylene glycol acrylate with $(CH_2CH_2O)_n$, n=1-20, acrylamide, methacrylamide, etc.

Reaction between the living radical polymerizing solution and the coupling agent on the plastics surface generates polymer chains from the surface to give covalently attached polymer brushes with high graft density and controlled molecular weight. Polymerization proceeds at 0° C. to 150° C. The highest temperature used should be below glass transition temperature of the plastics material. Preferred temperature is at 20 to 80° C. and the most preferred is at room temperature. The thickness of the chemical surface coating here is controlled by polymerization time and concentration of the monomer and the catalyst. The molecular structure of the coating is determined by the structure of the monomers and polymerization process. When a mixture of two or more monomers is added at the same time, a random copolymer coating layer is formed. When a crosslinking agent e.g. a diene is added, a crosslinked polymer coating is produced.

In order to increase stability of the coatings, a suitable crosslinking agent may be used together with addition monomers for the polymerization. The crosslinking agent is usually di, tri and tetra-functional molecules. The commonly used crosslinking agents in this invention are the di, tri and tetra olefins. Preferred crosslinking agents are selected from divinylbenzene, N,N'-methylenebisacrylamide, triallylamine, ethyleneglycoldiacrylate, tetraethyleneglycoldiacrylate, 1,1,1-trimethylolpropanetriacylate and tetraallyloxyethane. The cross-linking reaction can greatly increase the stability of the polymer coating and prevent its degradation and leaking.

This invention also provides a block copolymer coating on the plastics surface. Chemical surface coating formed by block copolymers are very useful to tune the surface properties. Hydrophobic block, such as polymethacrylate and polystyrene can increase the stability of the coating. Hydrophilic block, such as polyethylene glycol and polyacrylamide creates biocompatibility and enables resistance to biological binding. Some special polymer block, such as polytetrafluoroethylene can greatly enhance oxygen permeability that makes contact lens wearing more comfortable. Tethering block copolymers bonded to surfaces is particularly interesting because it provides responsive, controllable interfaces with nanoscale features. The topology of block copolymer also suggests their use in forming multilayered materials where the layers can be arranged in a predetermined order. A combination of the polymer blocks with different properties will greatly improve the properties of the contact lens. Growth of such films from tethered initiators complements other layer-by-layer schemes for thin film coatings (Winterton et al, "Single dip process for achieving a layer-by-layer-like coating", US Patent 2001/0048975A1).

This invention is particularly powerful for the preparation of surface-tethered block copolymers because the "living" polymer chain radical is confined to the surface. After one polymer chain is formed on the surface, the end group of the polymer chain is still an initiator that can be initiated again to graft another polymer. Therefore, block copolymers can be prepared by the sequential activation of the dormant chain end in the presence of different monomers. Besides, the length of the copolymer chain is controlled by the elapsed polymerization time of each steps of the polymerization. After rinsing to remove residual catalyst and monomer, the polymerization can be reinitiated to extend the chains, or multiblock copolymers can be synthesized by simply switching to a different monomer after each cycle. Therefore, synthesizing surface-tethered block copolymers can be achieved by the sequential addition of two or more monomers during polymerization from a surface. Specific examples include, but not limit to: polyacrylamide-b-poly(hydroxyethyl acrylate), polyacrylamide-b-poly(polyethylene glycol acrylate), polyacrylamide-b-poly(sugar acrylates), polyacrylamide-b-poly(glycide acrylate), etc.

A specific feature of this invention is that the end groups of the polymer chains on the surface in this invention contain halogens. In addition, the monomer may have certain functional groups, leading to a polymer chain formed with certain functional groups, such as hydroxyl group. Both of those functional groups can be converted to various functional groups to tune the chemical and physical properties of the polymer coating.

Using suitable polymerization conditions, e.g. a monomer, a catalyst and a solvent at certain temperature, linear polymer chains are then grown from the surface to give covalently attached polymer brushes with high graft densities and molecular weights. By adding a second non-initiation molecule with the initiator for the coupling reaction, the density of the initiator on the surface can be well controlled, resulting in controlled density of polymer chains. "Living" radical polymerizations have a number of advantages over traditional free radical procedures, such as free radical polymerization, and photo initiation polymerization. (1) The surface "living" radical polymerization only occurs on the surface. There is no free polymer formed in solution. This process dramatically saves the reagents and lowers the manufacturing cost. For example, a very thin coating, 200 nm thick polyethylene glycol methacrylate on a pair of 1 cm diameter contact lens only needs 0.1 mg of material. (2) No free polymer in solution results in no physically attached polymer onto the surface, which greatly simplifies the clean-up procedure, which also lowers the manufacturing cost. (3) The coating prepared by this process is very uniform and well controlled in terms of the thickness and functionality. Compared with surface free radical polymerization which can not control the growth of polymer thin film and usually grows the coating thickness no more than 5 nm, surface "living" radical polymerization can prepare the polymer coating with thickness well controlled from a few of nanometers to a few microns, even though the thickness is preferred from 1 nm to 1,000 nm. The functionality can be tuned to make the polymer coating very hydrophilic or hydrophobic or combination of both. This process also can be useful for making uniform coating layer with various random- or diblock-, or triblock- and multiblock-copolymers. (3) The polymer chains prepared by this process are in order. (4) Surface "living" radical polymerization also allows preparing di- and multi-block copolymer chains.

Block copolymers are prepared by the sequential activation of the dormant chain end in the presence of different monomers. However, the use of traditional free radical process predudes the formation of block copolymer brushes or accurate control of polymer structure. 5) A low polymerization temperature that is compatible with temperature-sensitive substrates, and friendly aqueous reaction environment.

This invention provides a uniform and hydrophilic coating on the contact lens surface to render bio-compatibility and suppress bindings of proteins, bacteria or other biological entities. The coated contact lens is capable of continuous wearing over a long period of time and in the mean time providing good wettability and high permeation to oxygen without adverse effects to the cornea.

EXAMPLES

The present invention is further defined in the following Examples. It should be understood that these Examples are given by way of illustration only. From the above discussion and this Example, one skilled in the art can ascertain the essential characteristics of this invention, and without departing from the spirit and scope thereof, can make various changes and modifications of the invention to adapt it to various uses and conditions.

The following materials which were purchased from Aldrich Chemical Co., P.O. Box 2060, Milwaukee, Wis. 53201:

Acrylamide, 99+% electrophoresis grade
Polyethylene glycol methacrylate (Average MW 360)
Bipyridine, 99.9+%
Copper(I) chloride (CuCl), 99.9+%
Copper(II) chloride ($CuCl_2$), 99.9+%
5-hexen-1-ol
Triethylamine
$HSiCl_3$
$Cp_2PtCl_2$
2-bromo-2-methylpropionyl bromide
Sodium hydroxide
Hydrochloric acid
Toluene
Other organic solvents such as acetone, methanol, ethanol, THF, methylene chloride are also from Aldrich.

Example 1

Synthesis of Pent-4-enyl-2-bromo-2-methyl propionate Precursor

With continuous stirring, 146 mL of 5-hexen-1-ol (3.0 mol) and 10 mL of triethylamine (60.0 mmol) were added at 0° C. and under a nitrogen gas atmosphere to a 1000 mL round bottom flask containing 150 mL of dry $CH_2Cl_2$. 827 mL of 2-bromo-2-methylpropionyl bromide (3.0 mol) was added dropwise over 60 min to form a white triethylamine salt. The resulting solution was then stirred for 1 hour at 0° C. The solution was warmed to room temperature over the next 5 hours, and became dark brown in color. The precipitate was filtered off and rinsed with 500 mL methylene chloride. The filtrate was extracted 4 times with 250 mL/each of saturated aqueous ammonium hydroxide ($NH_4Cl$) and 4 times with 250 mL/each $H_2O$. The crude brown oil was characterized and used in the next step of synthesis. $^1$HNMR ($CDCl_3$, δ in ppm): 5.9-6.0 (m, 1H), 5.1-5.2 (d, 2H), 4.3 (m, 2H), 2.2 (m, 2H), 2.1 (s, 6H), 1.8 (m, 2H), 1.6 (m, 2H). Mass Spectrum (CI): m/z 248.

Example 2

Preparation of 5-Trichlorosilyl pentyl 2-bromo-2-methyl propionate Initiator

In a 500 mL flask equipped with a nitrogen purge, 190 g of pent-4'-enyl-2-bromo-2-methyl propionate and 125 mg $H_2PtCl_6$ in 1.0 g of isopropanol alcohol were mixed. 160 g of $HSiCl_3$ was added at room temperature dropwise. The reaction is exothermic. Stirred the mixture overnight at room temperature. All votatiles were evaporated in full vacuum. $^1$H NMR ($CDCl_3$, δ in ppm): 4.10-4.13 (t, 2H), 3.75-3.79 (q, 6H), 1.89 (s, 6H), 1.64 (m, 2H), 1.35, (m, 6H), 1.17-1.21 (t, 9H), 0.59 (m, 2H). MS (CI): m/z 430 ($M+NH_4$), 412 (M+H), 384 (M—$C_2H_5$), 367 (M—$C_2H_5O$), 287, 245, 180.

Example 3

Prophetic Experiment

Attachment of Coupling Initiator Agent on Contact Lens Surface

Step 1: Activate Contact Lens Surface to Generate Reactive Groups

A dried Lotrafilcon A lenses (polysiloxane/perfluoroether copolymer) is placed in a plasma reactor equipped with an external ring electrode and a 27.13 MHz radiofrequency (RF) generator. An inductively-coupled, cold glow discharge plasma generated by a radiofrequency generator impinges onto the contact lens surfaces which are 10 cm away the lower edge of the plasma zone. The reactor which contains the contact lenses is vacuumed to a certain pressure of 0.5 mbar. The RF is on the range of 1 to 100 MHz. The plasma discharge power is in the range of 10 to 1,000 Watts with preferred power range at 100 to 500 Watts. The contact lens surface is oxidized to form functional groups, mainly composed of —OH, —COOH, and —CHO.

Step 2: Self-Assembling an Initiator Monolayer on the Activated Contact Lens Surface In preparing 150 mL of 0.15% 5-Trichlorosilyl pentyl 2-bromo-2-methyl propionate, 0.225 mL of the 5-Trichlorosilyl pentyl 2-bromo-2-methyl propionate initiator prepared in accordance with example 2 is added to 150 mL anhydrous toluene, and stirred for 5 minutes. The solution is then transferred to a shallow beaker loaded with 10 pieces of clean, activated contact lens. The beaker is covered with aluminum foil and set on the bench for 1 hour at room temperature. The reacted contact lenses are then rinsed with toluene and acetone, and baked in an oven at 110° C. for 1 hour. After baking, the contact lens surface is very hydrophobic with the contact angle of 89° with water, which confirms that the coupling agent is chemically attached to contact lens substrate.

Example 4

Prophetic Experiment

Growing a Polyacrylamide (PAAm) Film on the Surface of a Contact Lens

In a typical reaction, an acrylamide monomer mixture having a 7.0 M concentration is prepared by adding 20.0 g of acrylamide (MW 71) and 20.0 g of nanopure water to a 100 mL round bottom flask. Then, 1.97 g of bipyridyl (MW 154), 0.114 mg of CuCl$_2$ (MW 134.5) and 0.417 mg CuCl (MW 99) are added to the flask. The flask is immediately sealed with a rubber septum and the mixture is stirred for 10 min under a nitrogen atmosphere. 5.0 mL of said mixture is transferred by syringe to a flask charged with an initiator monolayer coupled contact lens prepared in Example 3. The flask containing the contact lens is flushed with N$_2$ for 5 minutes and then sealed with a rubber stopper before charging of the chemicals. The reaction is allowed to continue for 14 hours, then rinsed with nanopure water and air-dried. After coating a polyacrylamide brush thin film on contact lens, its surface contact angle becomes 0° with water. Water completely wets the surface.

Example 5

Prophetic Experiment

Surface "Living" Radical Polymerization to Coat a Polyethylene Glycol Methacrylate (PEGM) Brush Film on Contact Lens Surface The clean, initiation monolayer coupled contact lens are the same as those in Example 4. In a typical polymerization reaction, a polyethylene glycol methacrylate monomer solution having a 1.5 M concentration is prepared by adding 4.0 g of polyethylene glycol methacrylate (MW 360) and 3.6 g of nanopure water to a 20 mL sample vial. Then, 0.0452 g of bipyridyl (MW 154), 0.0036 mg of CuCl$_2$ (MW 134.5) and 0.0134 mg CuCl (MW 99) are added to the vial. The vial is immediately sealed with a rubber septum and the mixture is stirred for 10 min under a nitrogen atmosphere. The above monomer solution is then transferred into a flask containing an initiator-coupled contact lens by N$_2$ pressure, then sealed with a rubber septum. The reaction is allowed to proceed at room temperature for 14 hours. Then the contact lens is rinsed with nanopure water. The contact angle of the PEGM brush polymer coated contact lens is 30° with water, indicating very hydrophilic surface.

Example 6

Prophetic Experiment

Surface "Living" Radical Polymerization to Coat a PEGM/PAAm Copolymer Brush Film on Contact Lens The clean, initiator-coupled contact lens are the same as those in Example 4. In a typical polymerization reaction, an ethylene glycol methacrylate monomer solution having a 1.5 M concentration is prepared by adding 4.0 g of ethylene glycol methacrylate (MW 360) and 3.6 g of nanopure water to a 20 mL sample vial. Then, 0.0452 g of bipyridyl (MW 154), 0.0036 mg of CUCl$_2$ (MW 134.5) and 0.0134 mg CuCl (MW 99) are added to the vial. The vial is immediately sealed with a rubber septum and the mixture is stirred for 10 min under a nitrogen atmosphere. The above monomer solution is then transferred into a flask containing an initiator-coupled contact lens by N$_2$ pressure. The reaction is allowed to proceed at room temperature for 14 hours. Then the capillary is rinsed with nanopure water. After first block of PEGM thin film is bonded onto the contact lens, the acrylamide monomer solution prepared according to example 4 is transferred into the flask containing PEGM coated contact lens under N$_2$ pressure. The reaction is allowed to proceed for 14 hours, then rinsed with nanopure water. A copolymer of PEGM/PAAm is grown on the contact lens.

What is claimed is:

1. A chemically coated surface comprising:
   a) a plastics surface;
   b) a coupling agent;
   c) a chemical surface coating comprising at least one addition polymer;
   wherein the chemical surface coating and the coupling agent are covalently bonded, and the coupling agent is a polymer or an oligomer comprising of:
      (a) at least two functional groups capable of binding onto the plastics surface
      (b) at least two functional groups capable of generating a living radical for initiating polymerization of addition monomers;
   and wherein the coupling agent has a hydrocarbon backbone.

2. A chemically coated surface of claim 1, wherein the coupling agent is selected from the group consisting of:

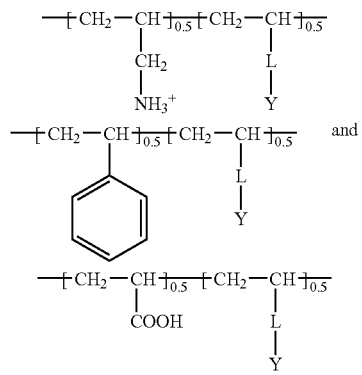

wherein L is a divalent organic moiety, Y is a functional group capable of generating a living radical for initiating polymerization of addition monomers.

3. A chemically coated surface of claim 2, wherein Y is:

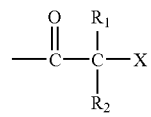

R$_1$, R$_2$ are independently selected from a group consisting of H, hydrocarbyl and substituted hydrocarbyl, X is selected from Cl, Br and I.

4. A chemically coated surface of claim 3, wherein R$_1$=R$_2$=CH$_3$, X is Cl or Br.

5. A chemically coated surface of claim 2, wherein Y is:

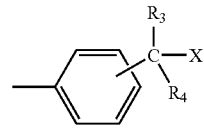

R$_3$, R$_4$ are independently selected from a group consisting of H, hydrocarbyl and substituted hydrocarbyl, X is selected from Cl, Br and I.

6. A chemically coated surface of claim 5, wherein $R_3=R_4=CH_3$, X is Cl or Br.

7. A chemically coated surface of claim 1, wherein the polymer or oligomer is prepared from acrylic acid and the following molecule:

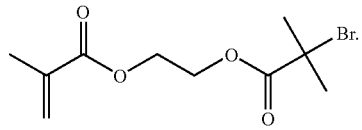

8. A chemically coated surface of claim 1, wherein the polymer or oligomer is prepared from

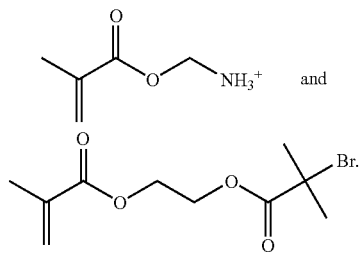

9. A chemically coated surface of claim 1, wherein the at least one addition polymer is prepared from addition monomers selected from a group consisting of acrylates and its derivatives, methacrylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid.

10. A chemically coated surface of claim 9, wherein the addition monomers are selected from a group consisting of polyethylene glycol methacrylate with $(CH_2CH_2O)_n$, n=1-20, polyethylene glycol acrylate with $(CH_2CH_2O)_n$, n=1-20, glycidyl methacrylate, glycidyl acrylate, acrylamide, methacrylamide and vinyl pyrolidone.

11. A chemically coated surface of claim 10, wherein the addition monomers are selected from a group consisting of polyethylene glycol methacrylate with $(CH_2CH_2O)_n$, n=1-20, polyethylene glycol acrylate with $(CH_2CH_2O)_n$, n=1-20, acrylamide, methacrylamide.

12. A chemically coated surface of claim 1, wherein at least two addition polymers are crosslinked.

13. Contact lens made with the chemically coated surface of claim 1.

14. A method for making a chemically coated surface, comprising:
    (a) contacting a plastics surface with a coupling agent solution, then
    (b) contacting the plastics surface with a first living radical polymerization solution, and optionally
    (c) contacting the plastics surface with a second living radical polymerization solution
wherein the coupling agent is a polymer or an oligomer comprising of:
    (i) at least two functional groups capable of binding onto the plastics surface
    (ii) at least two functional groups capable of generating a living radical for initiating polymerization of addition monomers;
and wherein the coupling agent has a hydrocarbon backbone.

15. A method for making a chemically coated surface of claim 14, wherein the polymer or oligomer is prepared from acrylic acid and the following molecule:

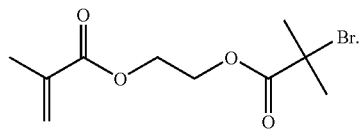

16. A method for making a chemically coated surface of claim 14, wherein the polymer or oligomer is prepared from

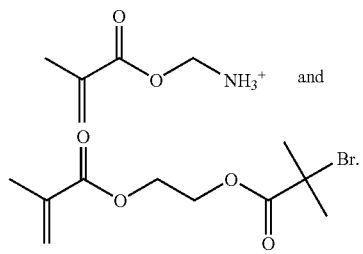

17. A method for making a chemically coated surface of claim 14, wherein the first and second living radical polymerizing solution independently comprises of at least one solvent, at least one catalyst and at least one addition monomer.

18. A method for making a chemically coated surface of claim 17, wherein the solvent is a mixture of water and water miscible organic solvent.

19. A method for making a chemically coated surface of claim 17, wherein the solvent is water.

20. A method for making a chemically coated surface of claim 17, wherein the at least one catalyst is selected from the group consisting of $MX_nE_m$, wherein M is Cu; E is selected from bipyridine and its derivatives, n=1 or 2; m=2; X=Cl or Br.

21. A method for making a chemically coated surface of claim 20, wherein the catalysts are $CuCl(bipyridine)_2$ and $CuCl_2(bipyridine)_2$.

22. A method for making a chemically coated surface of claim 17, wherein the at least one addition monomer is selected from the group consisting of acrylates and its derivatives, methacrylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid, diolefins, triolefins and tetraolefins.

23. A method for making a chemically coated surface of claim 22, wherein the at least one addition monomer is selected from the group consisting of polyethylene glycol methacrylate with $(CH_2CH_2O)_n$, n=1-20, polyethylene glycol acrylate with $(CH_2CH_2O)_n$, n=1-20, glycidyl methacry late, glycidyl acrylate, acrylamide, methacrylamide and vinyl pyrolidone.

24. A method for making a chemically coated surface of claim 23, wherein the at least one addition monomer is selected from the group consisting of polyethylene glycol methacrylate with $(CH_2CH_2O)_n$, n=1-20, polyethylene glycol acrylate with $(CH_2CH_2O)_n$, n=1-20, acrylamide, methacrylamide.

25. Contact lens made with the chemically coated surface prepared by the process of claim 14.

* * * * *